May 6, 1969 HANS-DIETER SCHNEIDER 3,443,147

TELEVISION CATHODE RAY TUBE APPARATUS

Filed July 10, 1967

Inventor:
Hans-Dieter Schneider by Michael S. Striker

Attorney

United States Patent Office
3,443,147
Patented May 6, 1969

3,443,147
TELEVISION CATHODE RAY TUBE APPARATUS
Hans-Dieter Schneider, Grossgerau, Germany, assignor to Fernseh GmbH, Damstadt, Germany
Filed July 10, 1967, Ser. No. 652,164
Claims priority, application Germany, July 16, 1966, F 49,710
Int. Cl. H03k *5/00;* H01j *29/70*
U.S. Cl. 315—27 8 Claims

ABSTRACT OF THE DISCLOSURE

In a television cathode ray tube apparatus a circuit arrangement for obtaining independent correction of the amplitude and linearity deviations of the deflection waveform for the serially connected deflection coils of pickup tubes in a television apparatus by means of potentiometers in shunt to the deflection coils, the sliders of which are connected with both ends of the potentiometer by a diode resistor combination.

*Background of the invention*

Figure 1:
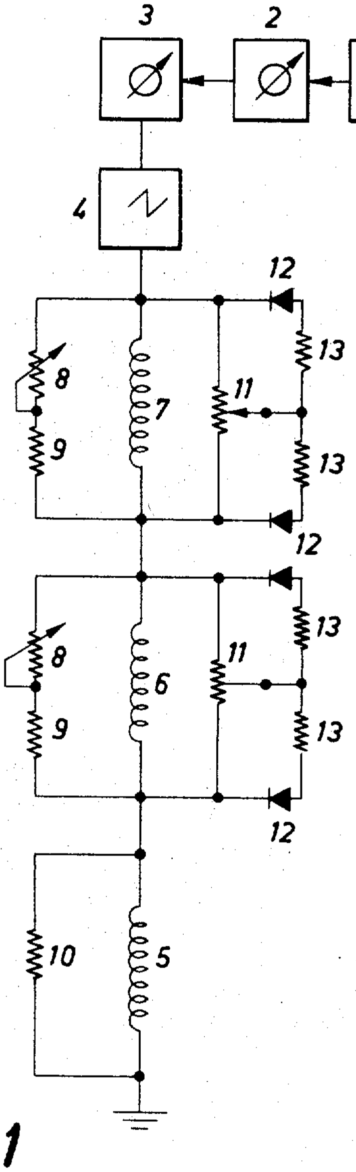

This invention relates to a circuit arrangement for correcting deviations from linearity in the vertical deflection field of a plurality of simultaneously deflected television pickup or picture-reproducing tubes.

In color television apparatus employing a plurality of pickup or picture-reproducing tubes it is advantageous to connect in series the deflection coils for producing the vertical deflection field used to deflect the electron beams of, for example, the pickup tubes in a color television camera, in order to produce improved stability of the color registration. Correction of the amplitude and linearity of the individual scanning patterns to obtain good picture geometry and registration cannot then be effected in the scan generator, but must be effected by networks which are connected as shunts to the individual deflection coils.

If, when a conventional scan generator is employed, only one such shunt is provided for each coil in order to equalize the amplitudes of the scanning patterns, then correction can be effected only with difficulty, since the interactions of the amplitude adjustments can be compensated only by protracted successive adjustments of the individual controls. If, however, an additional adjustable device is necessary for linearity correction, because the geometries of the individual scanning patterns deviate too greatly from one another, then the arrangement of further shunts for the linearity correction becomes impossible, because of the multiplicity of the interactions between the controls.

Interaction-free adjustment of the individual shunts becomes possible if the scan generator is constructed so that the amplitude of the deflection current fed through the whole load impedance is held constant. Amplitude correction may then be effected by means of a resistance connected in parallel with the coil to be corrected.

*Summary of the invention*

According to the present invention there is provided a circuit arrangement for supplying current to the series-connected vertical deflection coils of a plurality of television cathode ray tubes, wherein said current is provided by a current generator providing a deflection current of constant amplitude and wherein there is connected in shunt with one at least of said coils a network comprising a potentiometer having a resistance high compared with that of said coils, the adjustable tapping of said potentiometer being connected to each end of the resistance element thereof by way of the series combination of a diode and a resistor, said diodes being connected in opposed polarities.

The present invention provides an effective and interaction-free circuit arrangement for linearity correction, with which it is even possible to affect the curvature of the upper and lower portions of the sawtooth current waveform independently of one another.

Similar networks can be connected in shunt with others of the deflection coils, or in shunt with each of them. The advantage of this arrangement is that by adjusting the potentiometer tapping in one or on the other direction from the central position, in which no linearity correction is effected, curvature of either of the two peaks of the sawtooth current waveform can be effected as required, so that registration errors at the upper and lower margins of the picture may be corrected in a simple manner and without interaction upon the other deflection coils or scanning patterns.

The operation of this circuit arrangement is as follows. In the central setting of the potentiometer the diode circuit is completely blocked, so that only the shunting current drawn by the potentiometer itself is diverted from the deflection coils. If, on the other hand, the potentiometer tapping is displaced from the central position, then the diode circuit containing the lower resistance commences to draw current, specifically mainly towards the end of the sawtooth period. The current in the coil is correspondingly diminished during this period. The other diode branch does not pass any current, so that the other end of the sawtooth waveform remains unchanged. With this circuit arrangement it is thus conveniently possible to equalize asymmetries in the scanning patterns which arise from geometrical differences between the tubes or in the deflector assemblies.

*Specific description of preferred embodiment*

Figure 2:
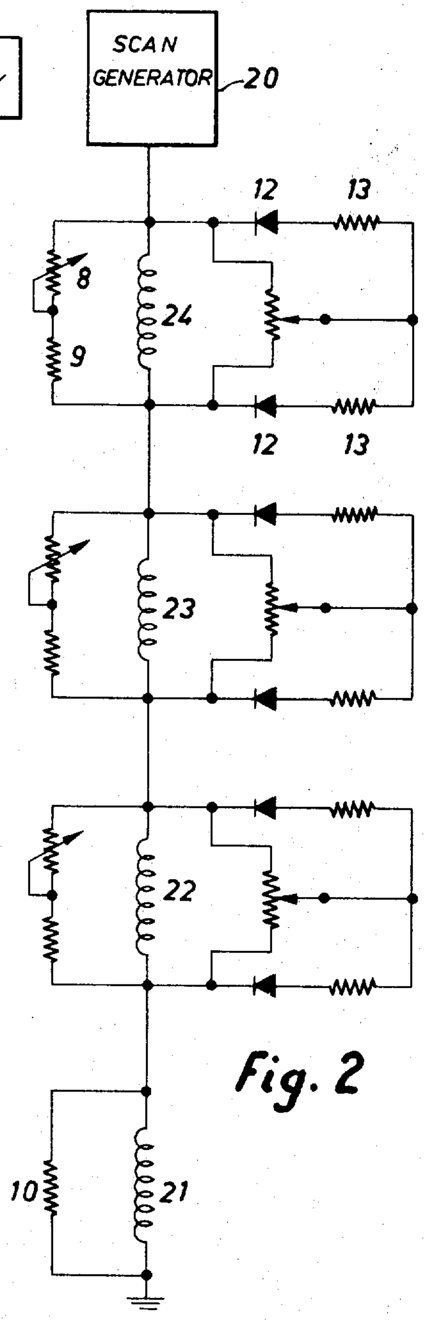

Further features and advantages of the invention will become apparent from the following description taken in conjunction with the accompanying drawings, of which:

FIGURE 1 is a schematic diagram illustrating the application of the invention to a three-tube color television camera; and FIGURE 2 is a schematic diagram illustrating the application of the invention to a four-tube color television camera, using a separate luminance tube.

In the drawing, FIGURE 1, block 1 represents a sawtooth generator, block 2 a device for adjusting the overall linearity of the vertical deflection voltage, block 3 a device including means for adjusting the total amplitude and block 4 a circuit for generating a sawtooth current with stabilized amplitude for vertical deflection. To the output of this circuit the three vertical deflection coils 5, 6 and 7 are connected in series. Coil 7 may be that associated with the tube for the red color component, coil 6 that for the blue component and coil 5 that for the green component. In parallel with each of coils 6 and 7 there is connected a purely resistive shunt circuit consisting of a potentiometer 8 and a series resistor 9. With the potentiometer in its central position of adjustment the current drawn by the shunt circuit is about 5% of the total deflection current. In parallel with deflection coil 5 for the green component is connected a simple resistor 10 likewise passing 5% of the scan current.

For linearity correction in accordance with the invention there is connected in shunt with at least one of the other deflection coils a potentiometer network, consisting of a potentiometer 11 shunted directly across the coil and having connected from each end of the potentiometer to its adjustable tapping the series combination of a diode 12 and a resistor 13.

The following component values have been found suitable for the vertical deflection current circuit of orthicon camera tubes used in a color television camera:

| | | |
|---|---|---|
| Resistors 9 | ohms each | 200 |
| Resistor 10 | ohms | 1,200 |
| Resistors 13 | ohms each | 820 |
| Potentiometers 8 | kiloms each | 2 |
| Potentiometers 11 | do | 35. |
| Coils 5, 6, 7 | ohms each | 20 |
| Diodes 12 | type | 1N914 |

In another embodiment of the invention, illustrated by FIGURE 2 of the drawings, a four-tube color camera includes a scan generator 20 developing a sawtooth current of vertical frequency which is fed to deflector coils 21, 22, 23 and 24 connected in series. Deflector coil 21 may be that associated with a luminance pickup tube of the color television camera, while coils 22, 23 and 24 are associated respectively with the pickup tubes yielding green, blue and red signal components. In shunt with each of deflector coils 22, 23 and 24 are connected networks each comprising a potentiometer 11, the tapping of which is connected to each end of the potentiometer by way of an individual series combination of a diode 12 and a resistor 13. In shunt also with the deflector coil and with potentiometer 11 is the series combination of a fixed resistor 8 and an adjustable resistor 9. The deflector coil 21 associated with the luminance tube is shunted by a fixed resistor 10.

What is claimed and desired to be secured by Letters Patent is:

1. Television cathode ray tube apparatus comprising in combination: a current generator generating a vertical frequency sawtooth current of constant amplitude; a plurality of deflector coils of predetermined impedance for individual cathode ray tubes; means connecting said deflector coils in series with said sawtooth current generator; a network comprising a potentiometer having a resistance high compared with that of a said coil and having an adjustable tapping thereon, together with a plurality of series combinations of a resistor and a diode connecting each end of said potentiometer to said tapping, said diodes being connected with opposed polarities; and means connecting said network in shunt with a said deflector coil.

2. Television cathode ray tube apparatus as claimed in claim 1 wherein a said network is connected in shunt with each of a plurality of said deflector coils.

3. Television cathode ray tube apparatus as claimed in claim 1 wherein said cathode ray tubes are pickup tubes included in a color television camera and developing respectively a luminance component signal and a plurality of color component signals; and wherein a said network is connected in shunt with a deflector coil associated with each of said pickup tubes developing a color component signal.

4. Television cathode ray tube apparatus as claimed in claim 1 wherein said cathode ray tubes are pickup tubes included in a color television camera and developing respectively a green, a blue and a red signal component and wherein a said network is connected in shunt with said deflector coil associated with each of said pickup tubes developing said red and said blue component signals.

5. Television apparatus as claimed in claim 1 wherein said network includes also an adjustable resistance connected in shunt with said potentiometer.

6. Television apparatus as claimed in claim 3 wherein each said network includes also an adjustable resistance connected in shunt with said potentiometer and wherein a fixed resistor is connected in shunt with said deflector coil associated with said pickup tube developing said luminance component.

7. Television apparatus as claimed in claim 4 wherein each said network includes also an adjustable resistance connected in shunt with said potentiometer and wherein a fixed resistor is connected in shunt with said deflector coil associated with said pickup tube developing said green component.

8. Method of adjusting the scanning pattern of television pickup tubes of a color television camera for correct color registration in vertical direction, with a deflection system comprising deflection coils for each camera tube connected in series, a scan generator for vertical deflection, means connected with said scan generator for adjusting the amplitude of the scanning wave form, means for adjusting the linearity of said waveform, an amplifier for amplifying said adjusted waveform and for feeding said deflection coils, the output amplitude of said amplifier being substantially independent to load variations, one of said coils (reference coil) being shunted with a resistor of high value relating to the ohmic resistance of this coil, the other coils being shunted by variable resistors and additionally by potentiometers, the adjustable tapping of each potentiometer being connected to each end of said potentiometers by way of a plurality of series combinations of a diode and a resistor, said diodes being connected in opposed polarities; adjusting the overall amplitude and linearity of said scanning wave form, adjusting by means of said variable resistors the scanning current in said coils in relation to said reference coil, and correcting by means of said potentiometers the inherent linearity deviations of the coils and their coordinated pickup tubes from the reference coil and the coordinated pickup tube, for complete registration of the scanning patterns.

No references cited.

RODNEY D. BENNETT, Jr., *Primary Examiner.*

JOSEPH G. BAXTER, *Assistant Examiner.*

U.S. Cl. X.R.

328—184